United States Patent
Cooley

(10) Patent No.: US 10,395,457 B2
(45) Date of Patent: Aug. 27, 2019

(54) USER RECOGNITION SYSTEM AND METHODS FOR AUTONOMOUS VEHICLES

(71) Applicant: GM GLOBAL TECHNOLOGY OPERATIONS LLC, Detroit, MI (US)

(72) Inventor: Robert B. Cooley, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 15/674,105

(22) Filed: Aug. 10, 2017

(65) Prior Publication Data

US 2019/0051069 A1    Feb. 14, 2019

(51) Int. Cl.

| G07C 9/00 | (2006.01) |
|---|---|
| B60R 25/25 | (2013.01) |
| G05D 1/00 | (2006.01) |
| G06K 9/00 | (2006.01) |
| G06Q 30/06 | (2012.01) |
| G07B 15/00 | (2011.01) |
| G10L 17/22 | (2013.01) |

(Continued)

(52) U.S. Cl.
CPC ......... *G07C 9/00158* (2013.01); *B60R 25/25* (2013.01); *G05D 1/0088* (2013.01); *G06F 21/32* (2013.01); *G06K 9/00255* (2013.01); *G06K 9/00288* (2013.01); *G06K 9/00348* (2013.01); *G06K 9/00382* (2013.01); *G06Q 30/0645* (2013.01); *G07B 15/00* (2013.01); *G07C 9/00571* (2013.01); *G10L 17/22* (2013.01); *G06F 16/784* (2019.01); *G06K 2009/00395* (2013.01); *G10L 25/63* (2013.01)

(58) Field of Classification Search
CPC ........... G07C 9/00158; G07C 9/00071; G07C 5/008; G07C 9/00142; G07C 9/00; B60R 25/25; G05D 1/0088
See application file for complete search history.

(56) References Cited

U.S. PATENT DOCUMENTS 7,917,768 B2 *  3/2011  Kahn ................. G06K 9/00348
                                                                713/156
10,088,846 B2 * 10/2018  Gao ........................ G06F 3/017
(Continued)

FOREIGN PATENT DOCUMENTS

WO    WO-2018189952 A1  * 10/2018

*Primary Examiner* — Courtney D Heinle
*Assistant Examiner* — Luis A Martinez Borrero
(74) *Attorney, Agent, or Firm* — Lorenz & Kopf LLP

(57) ABSTRACT

Methods and a system are disclosed for providing autonomous driving system functions. The system includes a controller providing functions for automated user recognition in the autonomous vehicle, at least one environmental sensor configured to scan an environment of the autonomous vehicle and to transmit scan data of the environment to a biometric recognition module of the autonomous vehicle, and a biometric recognition module configured to analyze the scan data of the environment based on a gesture recognition algorithm by using a processor. The gesture recognition algorithm analyzes the scan data of the environment based on at least one biometric feature by using the processor. The at least one biometric feature comprises at least a flagging down gesture and the controller is configured to stop the autonomous vehicle at a position relative to the user and to configure the autonomous vehicle to offer to the user the use of the autonomous vehicle.

18 Claims, 3 Drawing Sheets

(51) Int. Cl.
*G06F 21/32* (2013.01)
*G06F 16/783* (2019.01)
*G10L 25/63* (2013.01)

(56) References Cited

U.S. PATENT DOCUMENTS

| | | | |
|---|---|---|---|
| 10,096,216 B1* | 10/2018 | McClintock | G08B 13/1436 |
| 2004/0151349 A1* | 8/2004 | Milne, III | G06K 9/00208 |
| | | | 382/115 |
| 2017/0153714 A1* | 6/2017 | Gao | G06F 3/017 |
| 2017/0217445 A1* | 8/2017 | Tzirkel-Hancock | |
| | | | B60W 50/08 |
| 2017/0243042 A1* | 8/2017 | Walch | G06K 9/001 |
| 2017/0349184 A1* | 12/2017 | Tzirkel-Hancock | |
| | | | B60W 50/08 |
| 2018/0018179 A1* | 1/2018 | Scheufler | B60R 16/037 |
| 2018/0053276 A1* | 2/2018 | Iagnemma | G06Q 50/30 |
| 2018/0053412 A1* | 2/2018 | Iagnemma | H04M 1/72522 |
| 2018/0136655 A1* | 5/2018 | Kim | B60N 2/002 |
| 2018/0189547 A1* | 7/2018 | Daniels | G06K 9/00228 |
| 2018/0225307 A1* | 8/2018 | Kocher | G06K 9/00288 |
| 2018/0283889 A1* | 10/2018 | Koo | G01C 21/3484 |
| 2018/0284783 A1* | 10/2018 | Cooley | B60W 10/18 |
| 2018/0374002 A1* | 12/2018 | Li | G06Q 10/02 |

\* cited by examiner

USER RECOGNITION SYSTEM AND METHODS FOR AUTONOMOUS VEHICLES

TECHNICAL FIELD

The disclosure generally relates to autonomous vehicles, and more particularly relates to systems and methods for providing automated user recognition functions in an autonomous vehicle.

INTRODUCTION

An autonomous vehicle is a vehicle that is capable of sensing its environment and navigating with little or no user input. An autonomous vehicle senses its environment using one or more sensing devices such as RADAR, LIDAR, image sensors, and the like. An autonomous vehicle system further uses information from positioning systems such as (GPS) technology, navigation systems, vehicle-to-vehicle communication, vehicle-to-infrastructure technology, and/or drive-by-wire systems to navigate the vehicle.

Autonomous vehicles can be used as taxis or rental cars. For a billing or rental procedure, an identity of a particular user has to be determined by a particular autonomous vehicle. To determine the identity of the user, identification data is transmitted from a memory such as cell phone or another personal electronic device to the autonomous vehicle. This means that the user must have a personal electronic device to rent or to use the autonomous vehicle.

Accordingly, it is desirable to rent or to use an autonomous vehicle without using any personal electronic device. In addition, it is desirable to recognize a user based on biometric information. Furthermore, other desirable features and characteristics of the present invention will become apparent from the subsequent detailed description and the appended claims, taken in conjunction with the accompanying drawings and the foregoing technical field and background.

SUMMARY

In various aspects, a user recognition system for automated user recognition in an autonomous vehicle includes a controller with at least one processor providing functions for automated user recognition in the autonomous vehicle. The user recognition system includes at least one environmental sensor configured to scan an environment of the autonomous vehicle and to transmit scan data of the environment to a biometric recognition module of the autonomous vehicle. The user recognition system further includes a biometric recognition module configured to analyze the scan data of the environment based on a gesture recognition algorithm by using the at least one processor. The gesture recognition algorithm analyzes the scan data of the environment based on at least one biometric feature by using the at least one processor. The at least one biometric feature includes at least a flagging down gesture. The controller is configured to stop the autonomous vehicle near the user, this means at a position of the user, i.e. a distinct distance from the user and to configure the autonomous vehicle to offer to the user the use of the autonomous vehicle, if the gesture recognition algorithm recognizes a user showing a flagging down gesture according to the at least one biometric feature in the scan data of the environment.

In various embodiments, a biometric feature describes a movement of at least one limb of a user. In this embodiment, the flagging down gesture is described by a set of given features which comprises information about an orientation of limbs of a user in certain angles to each other or a movement of the limbs of the user relative to his environment, i.e., relative to current background data.

In various embodiments, the controller focuses at least one sensor of the autonomous vehicle on the user if the gesture recognition algorithm recognizes a user showing a flagging down gesture in the scan data of the environment according to the at least one biometric feature.

To focus a sensor on a user, the sensor determines data related to the user. Thus, the sensor is moved in the direction of the user or determines data that are related to the user only, for example.

In various embodiments, the biometric recognition module analyzes a gait of the user using a gait analyzing algorithm that analyzes current scan data of the environment while the user approaches the vehicle.

In various embodiments, a gait of a user is analyzed by tracking a movement of at least one limb and/or a head and/or any other body part of the user.

In various embodiments, the user recognition system includes a server and the controller transmits results of the gait analyzing algorithm and/or results of the gesture recognition algorithm to the server by using a communication module. The server is configured to search for data related to the results of the gesture recognition algorithm and/or the results of the gait analyzing algorithm in a database and to transmit the data related to the results of the gesture recognition algorithm and/or the results of the gait analyzing algorithm to the controller by using the communication module.

The communication module may be configured to wirelessly communicate information to and from entities outside the autonomous vehicle, such as but not limited to servers which may be part of other vehicles ("V2V" communication) or a particular infrastructure ("V2I" communication). The communication system may be a wireless communication system configured to communicate via a wireless local area network (WLAN or WIFI) using IEEE 802.11 standards or by using cellular data communication. However, additional or alternate communication methods, such as a dedicated short-range communications (DSRC) channel, are also considered within the scope of the present disclosure.

In various embodiments, data transmitted from the server to the controller include at least data of a profile of the user, expected facial data of the user and a voice map of the user.

In various embodiments, the server may comprise a database of user data, such as data of a profile of a user, expected facial data of a user and a voice map of a user, for numerous users.

In various embodiments, the controller is configured to exclude the user from using the autonomous vehicle, if the server does not find data related to the results of the gesture recognition algorithm and/or the results of the gait analyzing algorithm in the database.

In various embodiments, the user recognition system includes at least one facial recognition system that is configured to scan a face of the user using a face scanning sensor, such as a sensor that is configured to scan a face of a user, and to match the scan data of the face of the user with the expected facial data transmitted from the server by using the at least one processor of the controller. The controller is configured to unlock the autonomous vehicle and to start a dialog with the user, if the scan data of the face of the user match with the expected facial data transmitted from the server.

In various embodiments, the face scanning sensor is an optical sensor, such as a camera, an infrared sensor, a laser scanner or the like.

In various embodiments, the user recognition system includes at least one voice recognition system that is configured to scan voice data provided by the user during the dialog using a voice recognition sensor. The controller is configured to confirm the identity of the user if the scan data of the voice of the user match with the voice map transmitted from the server.

In various embodiments, the voice recognition sensor is an acoustic sensor, such as a microphone or the like.

In various embodiments, the dialog includes at least a question concerning a destination of the user.

In various embodiments, the voice recognition system is configured to extract information concerning the destination of the user from voice data provided by the voice recognition sensor. The controller is configured to determine a route to the destination of the user and to configure the autonomous vehicle to drive the user to the destination of the user.

In various embodiments, data transmitted from the server to the controller includes a list of identification data of users that are to be recognized based on the results of the gait analyzing algorithm and/or results of the gesture recognition algorithm submitted to the server. The controller is configured to confirm the identity of one single user based on the data transmitted from the server using a facial recognition system and/or a voice recognition system and/or to transmit data determined by the facial recognition system and/or the voice recognition system to the server, if the identity of one single user is not confirmed based on data transmitted from the server using the facial recognition system and/or the voice recognition system. If the controller transmits data determined by the facial recognition system and/or the voice recognition system to the server, the server is configured to confirm the identity of one single user based on the data determined by the facial recognition system and/or the voice recognition system and a database including facial data and/or voice data of a multitude of users and to transmit the confirmed identity of the one single user to the controller.

The amount of personal profile information that is sent to the controller of the user recognition system may be reduced to a list of likely candidates using the results of the gait analyzing algorithm and/or results of the gesture recognition algorithm submitted to the server. The list of likely candidates may be used for a comparison procedure, i.e. for a matching procedure, that matches data of particular candidates of the list of likely candidates with results of data determined by the facial recognition system and/or the voice recognition system. If the results of the data determined by the facial recognition system and/or the voice recognition system are inconclusive or the results don't match to personal profile information of at least one candidate, the controller may be configured to send facial information determined by a facial recognition system to the server, where an analysis, i.e. a matching procedure of the data determined by the facial recognition system and/or the voice recognition system may be run against, i.e. matched with, a full set of user profiles stored on the server.

In various embodiments, the controller is configured to determine the route to the destination of the user by transmitting information concerning the destination of the user extracted from the voice data provided by the voice recognition sensor to a server. The server is configured to generate a route to the destination of the user based on the voice data and to transmit the route to the controller by using a communication module.

In various embodiments, the voice recognition system is configured to extract information concerning an emotional state of the user from the voice data provided by the voice recognition sensor. Further, the controller is configured to modify a driving behavior based on the current emotional state of the user.

In various embodiments, the voice recognition system analyzes frequencies and/or amplitudes in the voice data provided by the voice recognition sensor and matches the frequencies and/or amplitudes with a set of given emotional states.

In various embodiments, the biometric recognition module is configured to extract user related data from the scan data of the environment by matching the scan data of the environment with data of the environment provided by at least one additional environmental sensor of the autonomous vehicle, such that only data that are related to the user are used by the gesture recognition algorithm to recognize the flagging down gesture and data related to a particular background are subtracted.

By subtracting background information from a dataset, data related to a particular user remain. Thus, algorithms for user recognition, such as the gesture and/or gait analyzing algorithms may be optimized, as they are performed by using user data only and therefore, are very precise.

In various embodiments, the at least one additional environmental sensor is selected from the list of: RADAR-sensor, LIDAR-sensor, ultrasonic-sensor, camera-sensors in multiple angles and microphone-sensor.

In various embodiments, the gesture recognition algorithm is based on a tracking algorithm of the autonomous vehicle to track road participants.

In various embodiments, the controller is configured to stop the autonomous vehicle at a position relative to the user and to offer the user the rental of the autonomous vehicle and to be charged by identifying the user based on biometric data of the user captured by at least one sensor of the autonomous vehicle, if the gesture recognition algorithm recognizes a user showing a flagging down gesture according to the at least one biometric feature in the scan data of the environment.

Unless being indicated as alternatives or referring to another embodiment, any two or more of the embodiments indicated above may be combined with the user recognition system, particularly with the controller of the user recognition system.

In various aspects, an autonomous vehicle is provided that includes the controller of the user recognition system alone or in combination with one or more of the embodiments of the user recognition system described herein.

In various embodiments, the controller includes at least one environmental sensor configured to scan an environment of the autonomous vehicle and to transmit scan data of the environment to a biometric recognition module, at least one processor, and a biometric recognition module configured to analyze the scan data of the environment based on a gesture recognition algorithm by using the at least one processor of the controller. The gesture recognition algorithm analyzes the scan data of the environment based on at least one biometric feature by using the at least one processor. The at least one biometric feature includes at least a flagging down gesture. The controller is configured to stop the autonomous vehicle at a position relative to the user and to offer the user the use of the autonomous vehicle, if the gesture recognition algorithm recognizes a user showing a flagging down gesture according to the at least one biometric feature in the scan data of the environment.

According to an aspect, a method is provided for automated user recognition in an autonomous vehicle.

In various embodiments, the method includes the steps: scanning an environment of the autonomous vehicle by using at least one environment sensor of the autonomous vehicle and transmitting scan data of the environment to a biometric recognition module, analyzing the scan data of the environment based on a gesture recognition algorithm by using the at least one processor of the controller, which may be a processor of the biometric recognition module, analyzing the scan data of the environment based on the gesture recognition algorithm using on at least one biometric feature by using the at least one processor. The at least one biometric feature includes at least a flagging down gesture, and, if the gesture recognition algorithm recognizes a user showing a flagging down gesture according to the at least one biometric feature in the scan data of the environment and stopping the autonomous vehicle at the user and offering the user to use the autonomous vehicle.

In various embodiments, the method includes the steps: analyzing a gait of the user using a gait analyzing algorithm that analyzes current scan data of the environment while the user approaches the vehicle, transmitting results of the gait analyzing algorithm and/or results of the gesture recognition algorithm to a server by using a communication module and searching for data related to the results of the gesture recognition algorithm and/or the results of the gait analyzing algorithm in a database and transmitting the data related to the results of the gesture recognition algorithm and/or the results of the gait analyzing algorithm to the controller by using the at least one processor. The data transmitted from the server to the controller include at least data of a profile of the user, expected facial data of the user and a voice map of the user, scanning a face of the user using a facial scanning sensor and matching the scan data of the face of the user with the expected facial data transmitted from the server by using a facial recognition system, unlocking the autonomous vehicle and starting a dialog with the user, if the scan data of the face of the user match with the expected facial data transmitted from the server by using by using the controller, scanning voice data provided by the user during the dialog using a voice recognition sensor of a voice recognition system, matching the scan data of the voice of the user with the voice map transmitted from the server by using the at least one processor, which may be a processor of the voice recognition system, confirming an identity of the user if the scan data of the voice of the user match with the voice map transmitted from the server by using the controller, extracting information about the destination of the user from voice data provided by the voice recognition sensor by using the voice recognition system, determining a route to the destination of the user and configuring the autonomous vehicle to drive the user to the destination of the user by using the controller. The dialog includes at least a question concerning a destination of the user.

In various embodiments, the biometric recognition module and/or the communication module are included in the controller. Alternatively, the biometric recognition module and/or the communication module are implemented in a box separate from a box comprising the processor of the controller. A box implementing the biometric recognition module and/or the communication module may comprise an additional processor configured to perform logic and mathematical operations of the biometric recognition module and/or the communication module.

It is noted that in various embodiments, the method is modified in accordance with the functions of one or more of the embodiments of the user recognition system and/or the autonomous vehicle described above.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
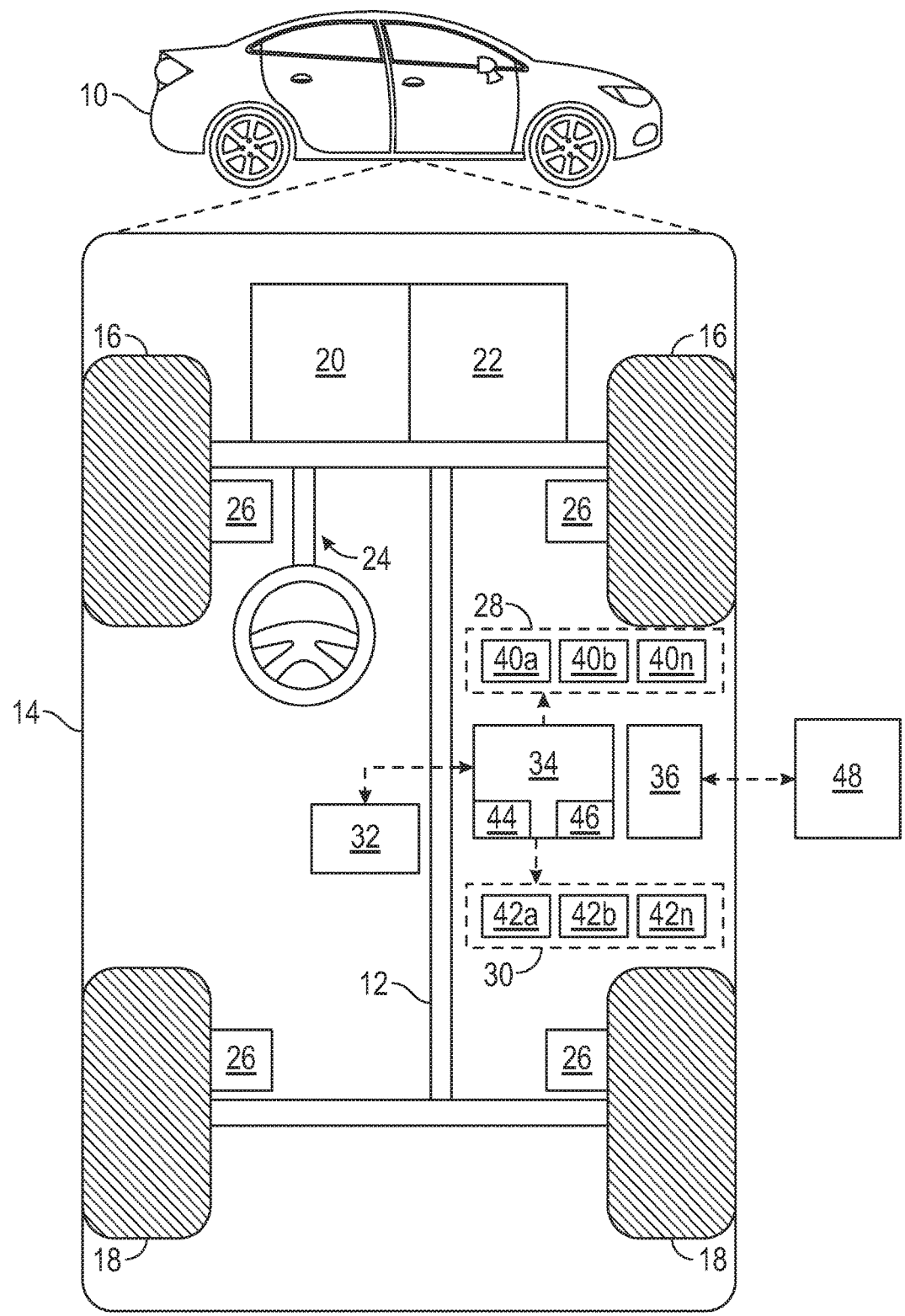
FIG. 1 is a functional block diagram illustrating a user recognition system having an autonomous vehicle, in accordance with an embodiment.

With reference to FIG. 1, a user recognition system 100 for automated user recognition in an autonomous vehicle is shown in accordance with various embodiments and aspects. The user recognition system 100 comprises an autonomous vehicle 10, which generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication module 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more environmental sensors 40a-40n that sense observable conditions of the exterior environment and/or the interior environment of the autonomous vehicle 10. The sensing devices 40a-40n can include, but are not limited to, RADARs, LIDARs, optical cameras, thermal cameras, ultrasonic sensors, microphones and/or other sensors. One or more of the sensors of the sensor system 28 are biometric sensors that sense biometric features of a user within the environment of the vehicle 10. In various embodiments, the biometric sensors can include, but are not limited to, image sensors configured to capture image of a user's face or other features, microphones configured to record a user's voice, etc. The actuator system 30 includes one or more actuator devices that receive control commands from the controller 34 to control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The communication module 36 is configured to wirelessly communicate information to and from other entities 48, such as but not limited to servers which may be part of other vehicles ("V2V" communication) or a particular infrastructure ("V2I" communication). In an exemplary embodiment, the communication module 36 is a wireless communication module configured to communicate via a wireless local area network (WLAN or WIFI) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. In various embodiments, the communication module 36 is configured to receive information from an external server 48.

The data storage device 32 stores data for use in automatically controlling the autonomous vehicle 10 and/or automatically recognizing a user. In various embodiments, the data storage device 32 stores data determined by the environmental sensors 40a-40n The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a microprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

In various embodiments, the control commands provided by the controller 34 include one or more separate programs, each of which comprises an ordered listing of executable instructions for implementing logical functions. The control commands, when executed by the processor 44, receive and process signals from the sensor system 28, perform logic, calculations, methods and/or algorithms for automatically controlling the components of the autonomous vehicle 10, and automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied to provide automated gesture recognition functions as described with reference to one or more of the embodiments herein. For example, one or more of the instructions are included in a gesture recognition module that performs one or more gesture recognition algorithms in order to automatically recognize a gesture of a user. For example, a gesture recognition algorithm analyzes the scan data of the environment provided by the environmental sensors 40a-40n. The gesture recognition module analyzes the data based on at least one defined biometric feature of a user. In a configuration of the user recognition system 100 disclosed herein, the gesture recognition algorithm detects patterns in the scan data of the environment provided by the environmental sensors 40a-40n such as patterns indicating a movement of physical feature of a user, particularly patterns indicating a flagging down gesture by an arm or hand. In various embodiments, the pattern indicating a flagging down gesture is recognized by matching data provided by the environmental sensors 40a-40n to at least one defined biometric feature. In various embodiments, the defined biometric feature may describe a movement of at least one limb of a user. In various embodiments, the defined biometric feature may be transmitted from the external server 48 to the controller 34. In various embodiments, one or more defined biometric features may be provided to the controller 34 by a technician. For example, the technician defines a particular biometric feature through specifying movements of limbs and/or an orientation of limbs to each other that are characteristic for the particular biometric feature.

In various embodiments, the flagging down gesture is described by a set of given features which comprises information about an orientation of limbs of a user in certain angles to each other. For example, the flagging down gesture is defined by set of biometric features that describe a pose and/or a gaze of a pedestrian. A pose that is recognized as a flagging down gesture may be a movement of an arm of a user pointing in the direction of the autonomous vehicle 10, a thumb moved in the direction the autonomous vehicle is running, an arm moved in a circle, two arms forming an "x", a body that is turning toward the autonomous vehicle 10, or the like. Particularly, a movement indicating a flagging down gesture may be recognized only for those users with body directions which indicate they are looking toward the vehicle. Thus, the flagging down gesture may be defined by a biometric feature that describes the orientation of a user's head pointing in the direction of the autonomous vehicle 10. This means, if the user does not look in the direction of the autonomous vehicle 10, the flagging down gesture will not be recognized and the autonomous vehicle 10 will not stop at the user.

The controller 34 is configured to stop the autonomous vehicle 10 at a position relative to a user, this means at a distinct distance from the user, and to configure the autonomous vehicle 10 to offer the user the use of the autonomous vehicle 10, if the gesture recognition algorithm recognizes a user showing a flagging down gesture according to the at least one biometric feature in the scan data provided by the environmental sensors 40a-40n. Thus, the controller 34 controls the autonomous vehicle in reaction to a command transmitted to the controller 34 by the biometric recognition module 30 indicating a recognized flagging down gesture.

The position relative to the user is determined by a pedestrian recognition system of the autonomous vehicle or by controller 34. Thus, the position of the user is determined by using GPS-coordinates or any other coordinates and a position relative to the user, such as a position in a distinct distance from the user is selected to stop the autonomous vehicle. This means, the autonomous control functions of the autonomous vehicle are used to stop the autonomous vehicle at the position determined relative to the position of the user.

The controller 34 is configured to transmit control commands to the propulsion system 20, the transmission system 22, the steering system 24 and/or the brake system 26 to stop the autonomous vehicle 10 at a coordinate of the user, i.e. at a coordinate distant from the user, determined by the biometric recognition module 30 using the gesture recognition algorithm and the scan data of the environment provided by the environmental sensors 40a-40n.

When the autonomous vehicle 10 stops at the coordinates of the user, the controller 34 transmits control commands to a communication module 36 to offer the user the use of the autonomous vehicle.

To offer the user the use of the autonomous vehicle 10, the communication module 36 starts a dialog with the user by using a speaker. Of course, the communication module 36 may additionally or alternatively use a display or any other user interface to contact the user.

The controller 34 or one of its functional modules is configured to identify at least one user based on the scan data of the environment provided by the environmental sensors 40a-40n. Thus, the controller 34 analyzes the scan data of the environment with respect to at least one biometric feature which may describe a gait and/or a gesture. Based on the at least one biometric feature, which may be provided by a technician using the communication module 36, for example, the controller 34 and/or a server, such as the external server 48, for example, is used to narrow a list of users to a set of likely candidates. This means, the likely candidates may be selected from a list of users based on data related to their gait and/or movement according to the scan data of the environment.

To select likely candidates from the list of users, the controller 34 may analyze the scan data of the environment with respect to at least one biometric feature. This means that data related to the at least one biometric feature are extracted from the scan data of the environment and matched to given parameters of the at least one biometric feature. The matching procedure may be performed by a gesture recognition algorithm such as an artificial neural network, a support vector machine, a pattern recognition algorithm or the like.

The gesture recognition algorithm is based on supervised or non-supervised algorithms. Thus, the gesture recognition algorithm is trained by using training data of particular users.

The at least one biometric feature used by the gesture recognition algorithm is a gait or a flagging down gesture.

A biometric feature describing a flagging down gesture may comprise information about an orientation of limbs of a user in certain angles to each other. Particularly, a biometric feature describing a flagging down gesture may comprise information about a thumb of a user pointing in a direction of a road the autonomous vehicle is driving on or on the autonomous vehicle directly. Alternatively, or additionally, a biometric feature describing a flagging down gesture may comprise information about an arm of a user that is lifted or waved. Of course, the biometric feature describing a flagging down gesture may comprise information about a special movement that is told to be used by a user as a flagging down gesture, such as a movement forming a circle, a cross or the like.

If the gesture recognition algorithm identifies one or more users, i.e. likely candidates, that may match to a particular set of biometric features or a particular biometric feature based on scan data of the environment, an identity of a particular candidate or user, respectively, is confirmed by using a facial recognition algorithm.

The facial recognition algorithm may be performed based on a set of facial features that characterize a user. The set of facial features is selected from a database based on the users recognized by the gesture recognition algorithm. The set of facial features is selected by the controller 34 using the processor 44 of the controller 34 and a database in the autonomous vehicle 10 or by the external server 48 using a database stored on the external server 48 or any server connected to the external server 48.

The set of facial features that is to be used to conform the identity of the user may be selected by the external server 48 based on a table comprising the likely candidates, wherein the table comprising the likely candidates is selected based on the results of the gesture recognition algorithm. The table comprising the likely candidates is transmitted from the external server 48 to the controller 34 via communication module 36.

If the autonomous vehicle 10 performs a facial recognition procedure based on user data selected from a database of the autonomous vehicle and the facial recognition procedure does not end up with a conformation of a user, i.e. with a conformation of one candidate out of the list of likely candidates, the external server 48 may be used to perform a second facial recognition based on user data selected from a database stored on the external server 48 or a server connected to the external server 48.

Since the set of facial features that is to be used to conform the identity of the user may be selected by the external server 48 based on a table comprising the users recognized by the gesture recognition algorithm, the number of users or likely candidates that are to be used for the facial recognition is limited with respect to a total number of likely candidates that may be recognized by the user recognition system. Thus, facial recognition speed can be increased and the number of comparisons, i.e. matches, is reduced by pre-selecting likely candidates using the gesture recognition algorithm.

The combination of the facial recognition algorithm with the gesture recognition algorithm is used to confirm the identity of a user. However, there may be situations where a very small number of likely candidates remains after performing the facial recognition algorithm. In this case, the gesture recognition algorithm and the facial recognition algorithm may be combined with a voice recognition algorithm.

The voice recognition algorithm is used to compare voice data of a particular user interacting with the autonomous vehicle 10 with voice recognition features selected from a database based on the users that remain as likely candidates after performing the facial recognition. Of course, the voice recognition algorithm can also be performed if only one user remains as a likely candidate after performing the facial recognition to increase a security level, for example.

The voice recognition features are selected by the external server 48 from a database stored on the external server 48 or a server connected to the external server 48, for example. The external server 48 selects the voice recognition features, such as a voice map of a user, for example, with respect to the results provided by the gesture recognition algorithm and/or the facial recognition algorithm.

As soon as a particular user is known, this means, as soon as the identity of the user is confirmed based on results of the gesture recognition algorithm and the facial recognition algorithm and/or the voice recognition algorithm, the user gets access to charges to his account or access his stored locations, for example.

Since the autonomous vehicle 10 is configured to drive in an autonomous way, the autonomous vehicle 10 is configured to track an environment during movement using the environmental sensors 40a-40n, the data determined during movement of the autonomous vehicle may be used as data to perform the method described herein or to modify the data used to perform the method described herein. Thus, gait analysis can be optimized since the autonomous vehicle 10 already knows an expected background from LIDAR-sensors and camera-sensors and can perform background subtraction, i.e. a subtraction of data that are irrelevant for gait analysis of a particular user.

Further, the ability to track road participants that is used for autonomous driving may be used to detect a specific customer approaching the vehicle.

By using redundant environmental sensors 40a-40n, a user can be recorded from multiple angles, thereby minimizing the chance of occlusion of user features.

The user recognition system described herein creates a clean user experience for autonomic vehicle ride share customers, particularly in high traffic areas where there may be multiple vehicles available at any time.

The user recognition system described herein may be used as a procedure to hail or to rent a car without using a user device such as a smartphone, for example.

Figure 2:
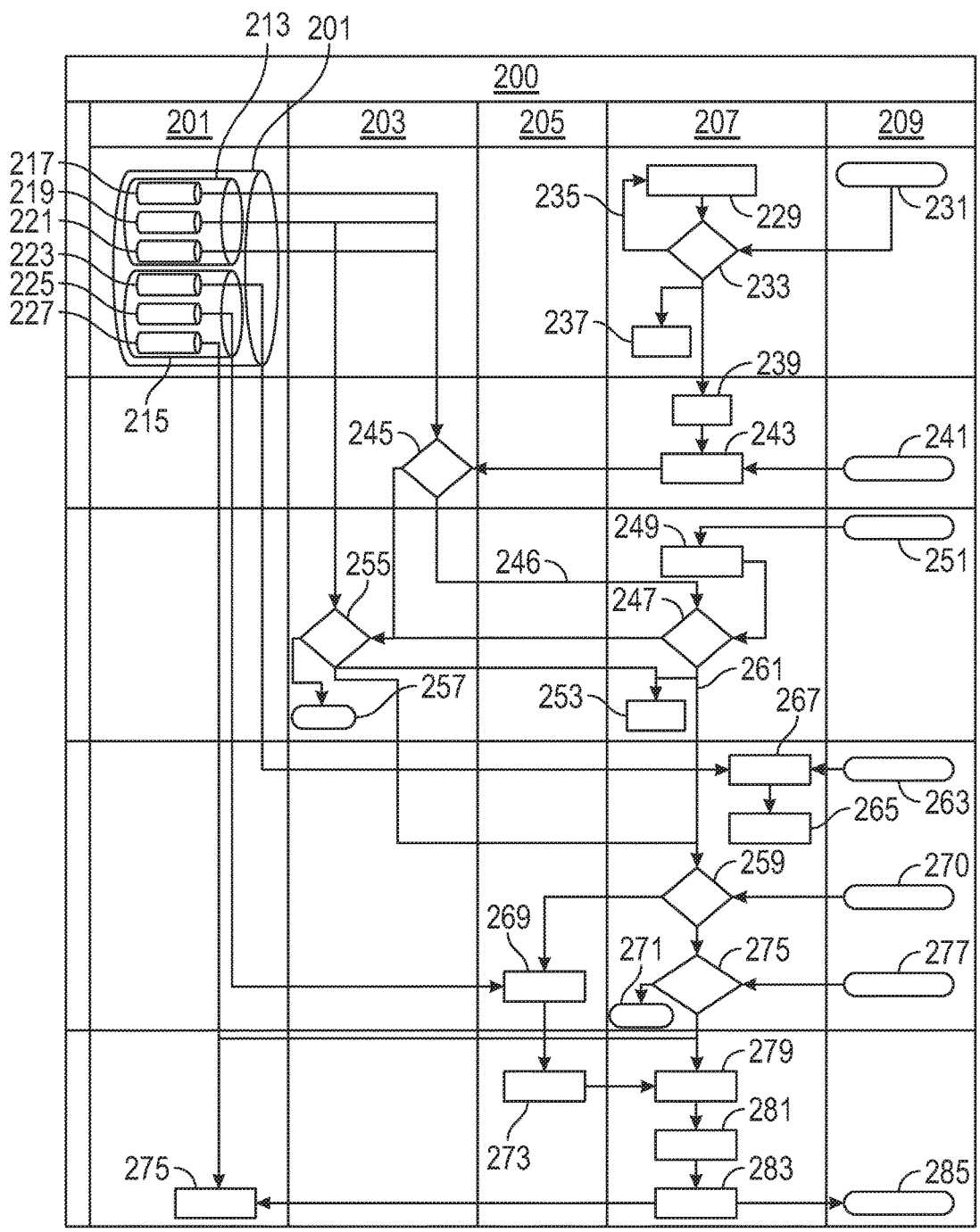
FIG. 2 is a functional block diagram illustrating a method providing functions for automated user recognition in an autonomous vehicle as shown in FIG. 1, in accordance with an embodiment.

With reference to FIG. 2, in various embodiments, the autonomous vehicle described with regard to FIG. 1 is suitable for use in the context of a taxi or shuttle system. For example, the autonomous vehicle may be associated with an autonomous vehicle based transportation system. FIG. 2 illustrates an exemplary embodiment of a user recognition system 200 for automated user recognition in an autonomous vehicle 207 as described with regard to FIG. 1.

In various embodiments, the user recognition system 200 includes an account server 201, a matching server 203, a routing server 205 and the autonomous vehicle 207 to recognize, i.e. to confirm an identity of a user 209 that interacts with the user recognition system 200.

The account server 201 includes a customer profile database 211 that includes a biometric module 213 and an account module 215.

The biometric module 213 stores a biometric features database 217, a facial feature database 219 and a voice recognition feature database 221.

The account module 215 stores user names in user name database 223, user specific locations in location database 225 and user billing information in billing information database 227.

The autonomous vehicle 207 constantly scans an environment of the autonomous vehicle 207 by using environmental sensors such as LIDAR, RADAR, cameras or the like in scanning step 229. If the user 209 shows a flagging down gesture in gesture step 231, the user 209 will be detected in detection step 233 using a gesture recognition algorithm that analyzes the data determined by the environmental sensors. If no user is detected, the autonomous vehicle 207 will continue scanning the environment in scanning step 229, as implied by arrow 235.

As soon as a user is detected in detection step 233, the autonomous vehicle is configured to pull over at a position relative to the user 209 in stopping step 237. Further, the autonomous vehicle 207 scans the user 207 in approaching scan step 239 using the environmental sensors during the user approaches the vehicle. This means, as the user 209 approaches the autonomous vehicle 207 in approaching step 241, the autonomous vehicle 207 extracts information 243 from the data provided by the environmental sensors according to his gait, for example. Information that may be used to analyze the gait of a user may be the length and/or the frequency and/or the cadence of particular steps. Of course, the height of a user may also be used to analyze the gait of the user.

In a matching procedure 245, the matching server 203, which may be part of the autonomous vehicle 207 or may be an external server, matches the information 243 with biometric features from the biometric feature database 217 stored in the biometric module 213 of the account server 201. If a result of the matching procedure 245 is greater than a given threshold, the user recognition system 200 continues with transmitting likely face maps and/or voice maps of potential users according to the biometric features of the biometric feature database 217 that have matched the information 243 in the matching procedure 245 to the autonomous vehicle 207, as implied by arrow 246. Based on the likely face maps and/or voice maps of potential users, the autonomous vehicle 207 performs a facial recognition algorithm 247 that matches the likely face maps of potential users with facial data of the user 209 determined by a facial recognition sensor of the vehicle 207 in facial matching step 249 as the user 209 arrives at the autonomous vehicle 207 in arriving step 251.

If the facial recognition algorithm 247 performed by the autonomous vehicle 207 ends up at a recognition rate greater that a given threshold, a door of the autonomous vehicle 207 will be unlocked in unlocking step 253.

If the facial recognition algorithm 247 performed by the autonomous vehicle 207 ends up at a recognition rate smaller than a given threshold, a second facial recognition algorithm 255 will be performed by using the matching server 203. The matching server 203 matches the facial data of the user 209 determined by the facial recognition sensor of the vehicle 207 in step 249 with every dataset available in the facial feature database 219. Thus, the second facial recognition algorithm 255 performed by the matching server 203 is much more complex than the facial recognition algorithm 247 performed by the autonomous vehicle 207, as the second facial recognition algorithm 255 performed by the matching server 203 uses a much greater number of datasets of users than the facial recognition algorithm 247 performed by the autonomous vehicle 207 which is based on likely face maps and likely voice maps of users selected based on the information 243.

If the result of the second facial recognition algorithm 255 performed by the matching server 203 is not greater than a given threshold, the whole procedure will end in termination step 257.

If the result of the second facial recognition algorithm 255 performed by the matching server 203 is greater than a given threshold, the procedure will continue with a voice recognition algorithm 259 and unlock the door in step 253. Further, voice maps of users that are likely to be recognized according to the second facial recognition algorithm 255 performed by the matching server 203 are transmitted to the autonomous vehicle 207.

If the facial recognition algorithm 247 performed by the autonomous vehicle 207 ends up at a recognition rate greater that the given threshold, the procedure will directly continue with the voice recognition algorithm 259, as implied by arrow 261.

As the user 209 enters the autonomous vehicle 207 in entering-step 263, the autonomous vehicle 207 starts a dialogue with the user 209 in dialogue step 267 by greeting the user 209 with a name that is according to user name database 223 associated with the facial data recognized in step 247 or 245, respectively and by asking for a desired location in question step 265.

As the user 209 speaks to the autonomous vehicle 207 to enter his desired destination and/or to get information about the duration of the trip to his destination in information step 270, a voice recognition algorithm 259 is performed that matches voice data provided by the user 209 and determined by voice recognition sensors of the autonomous vehicle 207 with the voice maps transmitted in step 255 or 247. If a result of the voice recognition algorithm 259 is greater than a given threshold, locations stored in the location database 225 are accessed in access step 269 by the routing server 203.

If a result of the voice recognition algorithm 259 is smaller than the given threshold, the autonomous vehicle 207 is configured to ask the user 209 for manual entering of his destination and/or billing information in manual step 275 in reaction to a respective request of the user 209 in step 277.

If the user 209 does not enter his destination and/or billing information in reaction to step 275, the procedure ends at termination step 271.

If the user 209 enters his destination and/or billing information in reaction to step 275, the destination is transmitted to the routing server 203. The routing server 203 generates a route to the destination in routing step 273 and transmits the route to the autonomous vehicle 207.

Further, if the user 209 enters his destination and/or billing information in reaction to step 275, the user 209 is charged by editing the user billing information in the billing information database 227 in charging step 277.

As soon as the route is transmitted to the autonomous vehicle 207, the user 207 is informed that the drive is starting in starting step 279.

In driving step 281 the user 209 is driven to his destination by the autonomous vehicle 207.

In arrival step 283 the autonomous vehicle 207 and the user 209 arrive at the destination of the user.

The user 209 exits the autonomous vehicle 207 in termination step 285 and the procedure terminates.

The most important steps the controller has to perform are: recognizing the flagging down gesture in step 233, then analyzing the gait of the user for matching procedure 245, then performing a facial recognition in step 245 and step 255 and finally, performing the voice recognition algorithm 259.

Figure 3:
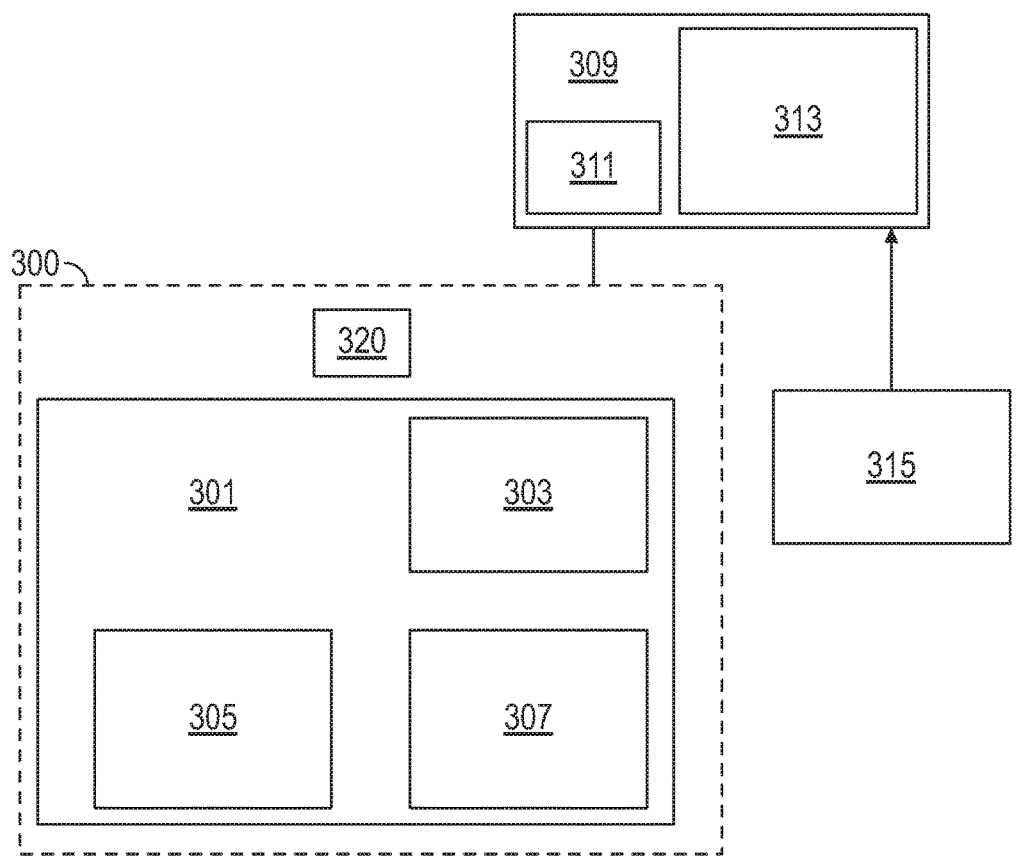
FIG. 3 is a functional block diagram illustrating a controller, in accordance with an embodiment.

In various embodiments, the instructions of the controller may be organized by function or system. For example, as shown in FIG. 3 according to an embodiment, a controller 300 includes a biometric recognition module 301. The biometric recognition module 301 includes the gesture recognition module 303, the facial recognition system 305 and the voice recognition system 307. The controller 300 is in communicative conjunction with a communication module 309. As can be appreciated, in various embodiments, the instructions may be organized into any number of systems (e.g., combined, further partitioned, etc.) as the disclosure is not limited to the present examples. In various embodiments, the method is implemented by the controller 34 shown in FIG. 1.

The communication module 309 includes an antenna 311 and a transceiver 313. The transceiver 313 is configured to receive signal from external sources such as a server 315 and to transmit received signals to the controller 300.

The transceiver 313 is further configured to transmit signals from the controller 300 to an external receiver such as the server 315.

The biometric recognition module 301 may use the processor 320 of the controller 300 to perform calculations or use a processor that is included in the biometric recognition module 301.

The biometric recognition module 301 is configured to match given data indicative of an identity of a user with data acquired by sensors of the user recognition system as shown in FIG. 1 by using a machine learning approach such as an artificial neural network, for example.

The biometric recognition module 301 analyzes data determined by an environmental sensor. This means, the gesture recognition module 303 generates a signal indicative of positive or negative recognition of a particular user based on matching procedures performed by the gesture recognition module 303, the facial recognition system 305 and the voice recognition system 307.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

LIST OF REFERENCE SIGNS 10 vehicle
12 chassis
14 body
16 front wheels
18 rear wheels
20 propulsion system
22 transmission system
24 steering system
26 brake system
28 sensor system
30 biometric recognition module
32 data storage device
34 controller
36 communication module
40a-40n environmental sensors
42a scanning sensors
42b voice recognition sensor
42n processor
44 processor
46 computer readable storage device or media
48 external server
100 user recognition system
200 user recognition system
201 account server
203 matching server
205 routing server
207 autonomous vehicle
209 user
211 profile database
213 biometric module
215 account module
217 biometric feature database
219 facial feature database
221 voice recognition feature database
223 user name database
225 location database
227 billing information database
229 scanning step
231 gesture step
233 detection step
235 arrow
237 stopping step
239 approaching scan step
241 approaching step
243 information
245 matching procedure
246 arrow
247 facial recognition algorithm
249 facial matching step
251 arriving step
253 unlocking step
255 facial recognition algorithm
257 termination step
259 voice recognition algorithm
261 arrow
263 entering-step
265 question step
267 dialogue step
269 access step
271 termination step
270 information step
273 routing step
275 manual step
277 charging step
279 starting step
281 driving step
283 arrival step
285 termination step
300 controller
301 biometric recognition module
303 gesture recognition module
305 facial recognition system
307 voice recognition system
309 communication module
311 antenna
313 transceiver
315 server
320 processor
400 method
401 gesture step
403 approaching step
405 transmission step
407 arrival step
409 question step
411 confirmation step
413 routing step
415 driving step

What is claimed is:

1. A user recognition system for automated user recognition in an autonomous vehicle, comprising:
a controller with at least one processor providing functions for automated user recognition in the autonomous vehicle;

at least one environmental sensor configured to scan an environment of the autonomous vehicle and to transmit scan data of the environment;

at least one recognition module configured to, by the at least one processor, analyze the scan data of the environment based on a gesture recognition algorithm, a first facial recognition algorithm, and a second facial recognition algorithm to identify a final user of the vehicle;

wherein the recognition module is configured to first analyze the scan data of the environment based on the gesture recognition algorithm and at least one biometric feature, wherein the at least one biometric feature comprises at least a flagging down gesture;

wherein the recognition module is further configured to analyze the scan data of the environment based on the first facial recognition algorithm and a first subset of facial data when multiple users are identified by the gesture recognition algorithm, wherein the first subset of facial data is obtained based on the scan data;

wherein the recognition module is further configured to analyze the scan data of the environment based on the second facial recognition algorithm and a second subset of facial data when multiple users are identified by the first facial recognition algorithm, wherein the second subset of facial data is larger than the first subset of facial data, and wherein the second subset of facial data is based on user data selected from a database;

wherein, the controller is configured to stop the autonomous vehicle at a position relative to the final user and to configure the autonomous vehicle to offer to the final user the use of the autonomous vehicle.

2. The user recognition system of claim 1,
wherein the controller is configured to focus at least one sensor of the autonomous vehicle on the user when the gesture recognition algorithm recognizes a user showing a flagging down gesture in the scan data of the environment according to the at least one biometric feature.

3. The user recognition system of claim 1,
wherein the recognition module is further configured to analyze the scan data based on a gait analyzing algorithm that analyzes current scan data of the environment while the user approaches the vehicle.

4. The user recognition system of claim 3,
wherein the user recognition system comprises a server and a communication module; and
wherein the controller is configured to transmit results of the gait analyzing algorithm and/or results of the gesture recognition algorithm to the server via the communication module; and
wherein the server is configured to search for data related to results of the gesture recognition algorithm and/or results of the gait analyzing algorithm in a database and to transmit the data related to the results of the gesture recognition algorithm and/or the results of the gait analyzing algorithm as the first subset of data to the controller by using the communication module.

5. The user recognition system of claim 4,
wherein data transmitted from the server to the controller comprise at least data of a profile of the user, expected facial data of the user, and a voice map of the user.

6. The user recognition system of claim 4,
wherein the controller is configured to exclude the user from using the autonomous vehicle if the server does not find data related to the results of the gesture recognition algorithm and/or the results of the gait analyzing algorithm in the database.

7. The user recognition system of claim 1,
wherein the at least one recognition module analyzes the scan data based on at least one voice recognition algorithm and a third subset of data, wherein the third subset of data includes voice map data transmitted from a server; and
wherein the controller is configured to confirm the final user when the scan data matches with the voice map transmitted from the server.

8. The user recognition system of claim 7,
wherein the scan data is obtained from a dialog comprising at least a question concerning a destination of the user.

9. The user recognition system of claim 8,
wherein the controller is configured to determine the route to the destination of the user by transmitting information about the destination of the user extracted from the voice data provided by the voice recognition sensor to a server; and
wherein the server is configured to generate a route to the destination of the user based on the voice data and to transmit the route to the controller by using a communication module.

10. The user recognition system of claim 7,
wherein the voice recognition algorithm is configured to extract information about an emotional state of the user from voice data provided by a voice recognition sensor; and
wherein the controller is configured to modify a driving behavior based on the current emotional state of the user.

11. The user recognition system of claim 1,
wherein the recognition module is configured to extract user related data from the scan data of the environment by matching the scan data of the environment with data of the environment provided by at least one additional environmental sensor of the autonomous vehicle, such that only data that are related to the user are used by the recognition module to recognize the flagging down gesture and data related to a particular background are subtracted.

12. The user recognition system of claim 11,
wherein the at least one additional environmental sensor is at least one or a combination of: LIDAR-sensor, camera-sensors in multiple angles and microphone-sensor.

13. The user recognition system of claim 1,
wherein the gesture recognition algorithm is based on a tracking algorithm of the autonomous vehicle to track road participants.

14. The user recognition system of claim 1,
wherein, if the gesture recognition algorithm recognizes a user showing a flagging down gesture according to the at least one biometric feature in the scan data of the environment, the controller is configured to stop the autonomous vehicle at the position relative to the user and to offer the user the rental of the autonomous vehicle and to pay for the rent by identifying the user based on biometric data of the user captured by at least one sensor of the autonomous vehicle.

15. A method providing functions for automated user recognition in an autonomous vehicle, comprising the steps:
scanning an environment of the autonomous vehicle by using at least one environment sensor of the autonomous vehicle and transmitting scan data of the environment to a recognition module;

analyzing, by the recognition module, the scan data of the environment based on a gesture recognition algorithm and at least one biometric feature;

analyzing, by the recognition module, the scan data of the environment based on a first facial recognition algorithm and a first subset of facial data when multiple users are identified by the gesture recognition algorithm, wherein the first subset of facial data is obtained based on the scan data;

analyzing, by the recognition module, the scan data of the environment based on a second facial recognition algorithm and a second subset of facial data when multiple users are identified by the first facial recognition algorithm, wherein the second subset of facial data is larger than the first subset of facial data, and wherein the second subset of facial data is based on user data selected from a database; and stopping the autonomous vehicle at a user identified by the analyzing and offering the user to use the autonomous vehicle.

16. The method of claim 15, wherein the biometric feature is a flagging gesture, wherein the first subset of facial data is obtained based on a recognized flagging gesture.

17. The method of claim 15, wherein the biometric feature is a gait, and wherein the first subset of facial data is obtained based on a recognized gait.

18. The method of claim 15, further comprising analyzing the scan data based on at least one voice recognition algorithm and a third subset of data, wherein the third subset of data includes voice map data transmitted from a server.

* * * * *